E. OUTREBON.
WEIGHING APPARATUS.
APPLICATION FILED SEPT. 25, 1912.

1,157,716.

Patented Oct. 26, 1915.
7 SHEETS—SHEET 1.

E. OUTREBON.
WEIGHING APPARATUS.
APPLICATION FILED SEPT. 25, 1912.

1,157,716.

Patented Oct. 26, 1915.
7 SHEETS—SHEET 2.

WITNESSES:
E. G. McBee.
William E. Tucker.

INVENTOR
Edouard Outrebon
BY
ATTORNEY

E. OUTREBON.
WEIGHING APPARATUS.
APPLICATION FILED SEPT. 25, 1912.

1,157,716.

Patented Oct. 26, 1915.
7 SHEETS—SHEET 3.

WITNESSES:
E. S. McGee.
William R. Tucker.

INVENTOR
Edouard Outrebon
BY
Emil Schmelzske
ATTORNEY

E. OUTREBON.
WEIGHING APPARATUS.
APPLICATION FILED SEPT. 25, 1912.

1,157,716.

Patented Oct. 26, 1915.
7 SHEETS—SHEET 5.

WITNESSES
E. B. McGee.
William E. Tucker.

INVENTOR
Edouard Outrebon
BY
ATTORNEY

E. OUTREBON.
WEIGHING APPARATUS.
APPLICATION FILED SEPT. 25, 1912.

1,157,716.

Patented Oct. 26, 1915.
7 SHEETS—SHEET 6.

WITNESSES
E. H. McBee.
William E. Tucker.

INVENTOR
Edouard Outrebon
BY
Emil Böinecke
ATTORNEY

E. OUTREBON.
WEIGHING APPARATUS.
APPLICATION FILED SEPT. 25, 1912.

1,157,716.

Patented Oct. 26, 1915.
7 SHEETS—SHEET 7.

WITNESSES
E. G. McGee.
H. C. M. Cartney

INVENTOR
Edouard Outrebon
BY
Emil Bönnelycke
ATTORNEY

UNITED STATES PATENT OFFICE.

EDOUARD OUTREBON, OF BÉTHUNE, FRANCE, ASSIGNOR TO MANUFACTURE D'HOR-
LOGERIE DE BÉTHUNE, OF BÉTHUNE, FRANCE, A CORPORATION.

WEIGHING APPARATUS.

1,157,716.  Specification of Letters Patent.  Patented Oct. 26, 1915.

Application filed September 25, 1912. Serial No. 722,236.

*To all whom it may concern:*

Be it known that I, EDOUARD OUTREBON, a citizen of the Republic of France, and resident of Béthune, France, have invented new and useful Improvements in and Relating to Weighing Apparatus, which improvements are fully set forth in the following specification.

This invention has reference to improvements in and relating to weighing apparatus, and particularly to that type which embodies a beam adapted to be operated either by hand for regulating loads to given weights, or automatically for indicating and recording fixed weights.

According to the present invention, there is provided a beam along which travels a self-propelled poise that is utilized to actuate the entire mechanism. Its movement, during the weighing operation, is rapid at first, but is later checked, so that it reaches a position of equilibrium insensibly and without shock. The weight of the load is then indicated automatically both upon the graduated beam and upon one or more dials, or in any other manner, and is also recorded upon a strip which may subsequently be used in checking up or in totalizing the weights and the number of successive weighing operations, in the order in which they were effected.

An embodiment of the invention is illustrated in the accompanying drawing, whereof:—

Figures 1 and 1ª together constitute a front elevation of the improved apparatus, with the dials and the front of the gear case omitted, the apparatus being assumed to be in course of operation; Figs. 8ª and 8ᵇ are front views showing two arrangements of vernier dials.

Referring more particularly to said drawing, the beam 4 of the apparatus is shown as having a knife-edge pivotal mounting 3 upon bearings 1, 1', provided in the cheeks of the frame 2, the short arm of the beam carrying the adjustable tare weight 5, while the long, graduated arm projects at its extremity between the branches of a forked bracket 6 which is suitably affixed to said frame. This bracket is utilized to lock the beam through the agency of the handle cam 7 and rod 8, and is provided with a fixed pointer 9, designed to indicate the exact position of equilibrium of the beam, which can readily be observed through windows in the case.

Figure 3:
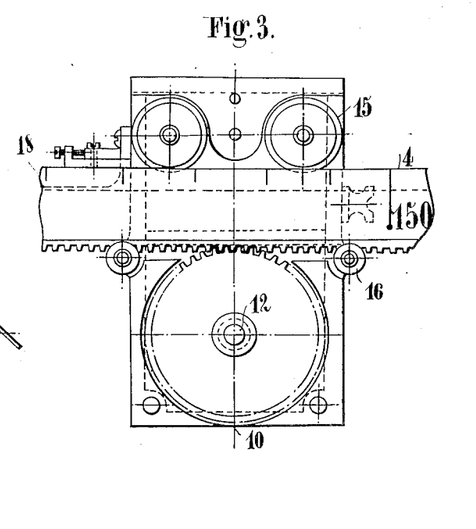
Fig. 3 is a vertical section of the sliding poise.
Figures 4, 5:
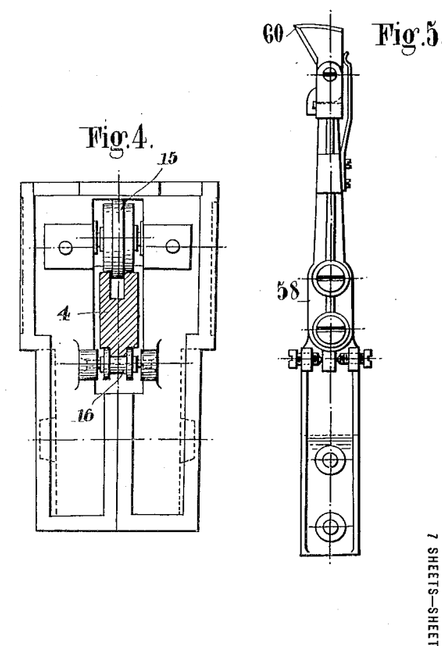
Fig. 4 is a side view of Fig. 3.
Fig. 5 is a front elevation of the detent for stopping the weighing operation.
Figure 6:
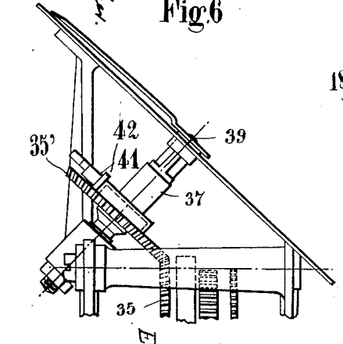
Fig. 6 is a detail view, showing the mounting of one of the dials, and the mechanism for operating the hand thereof.
Figure 7:
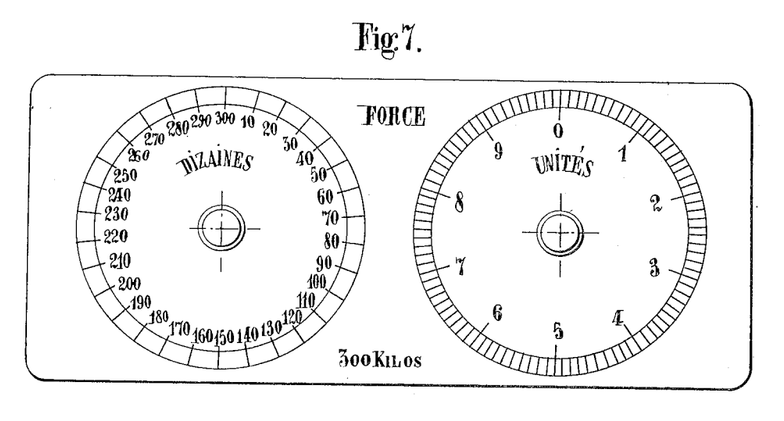
Fig. 7 is a front view, showing the dials which indicate the hectogrammes.
Figure 8A:
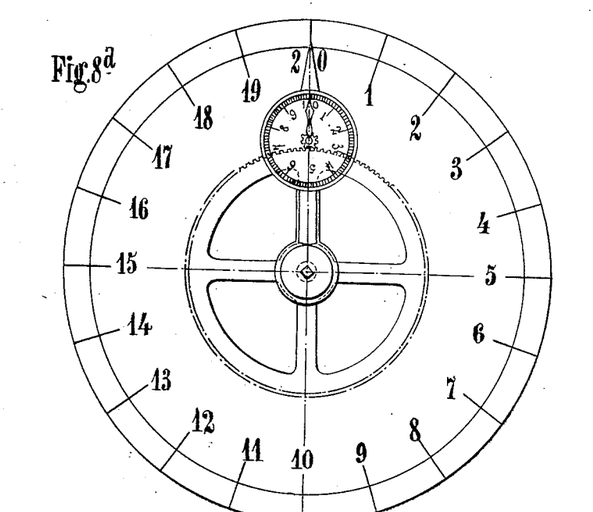
Figure 8B:
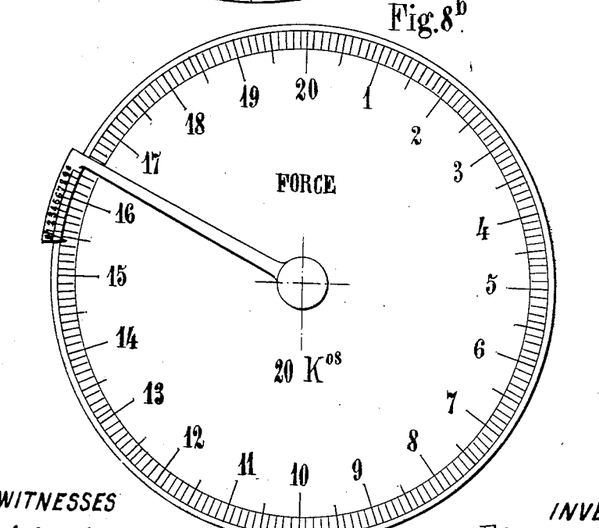

The self-moving poise 10, (Figs. 3 and 4), is adapted to travel along the beam, and is provided with pairs of suspension and guide rollers 15 and 16, between which said beam passes, the under face of the beam being formed with a rack that engages the externally-toothed case or drum of a spring-motor 11 located within the interior of the poise. The driving spring, (not shown), of the motor is secured at one end to the wall of the drum and at the other end to the shaft 12 whereon said drum is mounted, rotation of said shaft being prevented, during normal working, by the coaction of a ratchet 13 and pawl 14, the former of which is secured to the wall of the poise, and the latter to the shaft.

To the said poise is secured, by means of a clamp 18, or other suitable device, one end of a flexible metal ribbon 17, the other end of which is made fast in a notch 20 formed in the periphery of a wheel 19 that is caused to rotate, in consequence of its connection therewith, during the travel of the poise forwardly along the beam, said wheel having associated with it a clockwork mechanism which serves to control the starting and stopping of the poise, to regulate its speed, and to actuate the devices for indicating, recording and totalizing the weights. This mechanism consists, primarily, of a series of shafts designated by the numerals 22, 23, 24, 26 and 26', 27 and 28, a pair of speed regulators 25 and 57, a detent lever 31, and a stop pawl 32, all of which will be hereinafter fully described.

Figures 9, 10, 13, 15, 16, 17, 18:
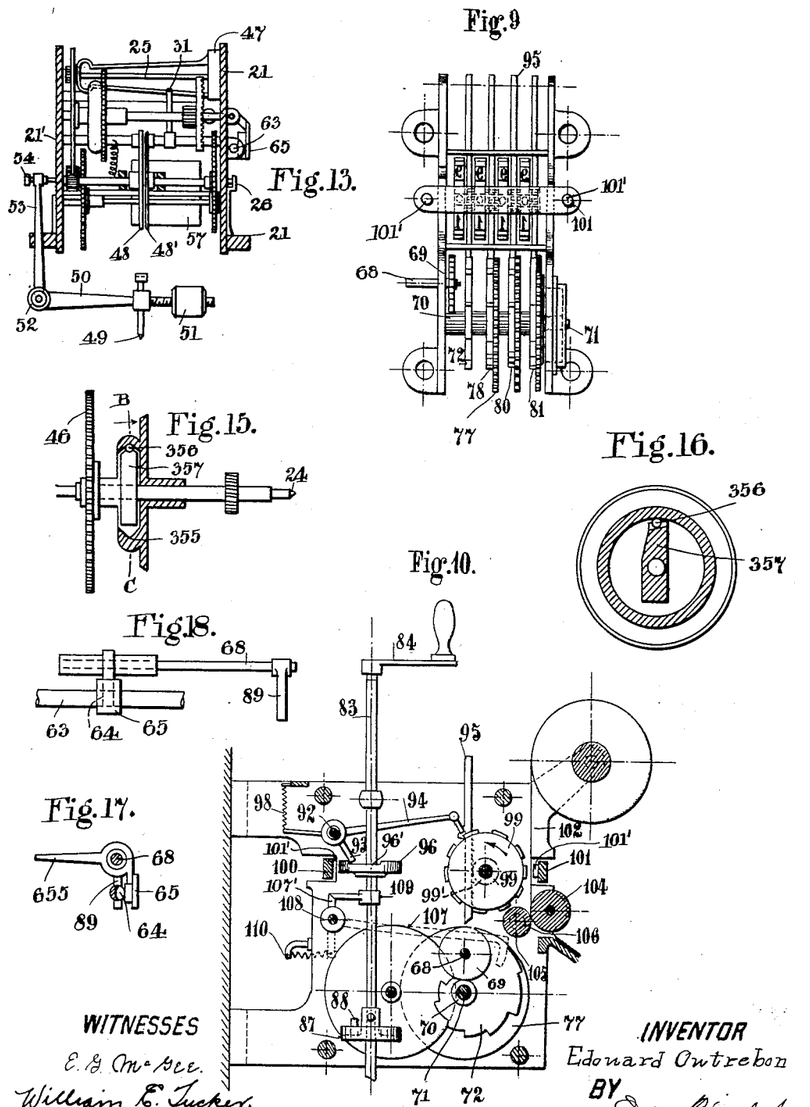
Fig. 9 is a front elevation of the recorder, showing the arrangement of the cams and the type wheels.
Fig. 10 is a side elevation of the recorder, with the left-hand cheek plate omitted.
Fig. 13 is a cross-section on line A—B, Fig. 12.
Figs. 15 and 16 are detail views of a clutch employed.
Figs. 17 and 18 are detail views of the push-button for starting the clockwork.
Figure 12:
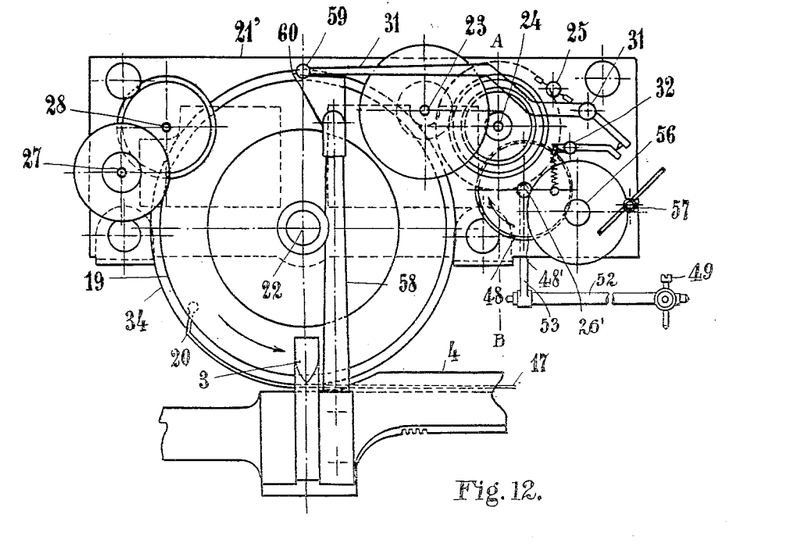
Fig. 12 is an enlarged, diagrammatic front elevation of the poise-moving means and its locking and speed-regulating devices.
Figure 14:
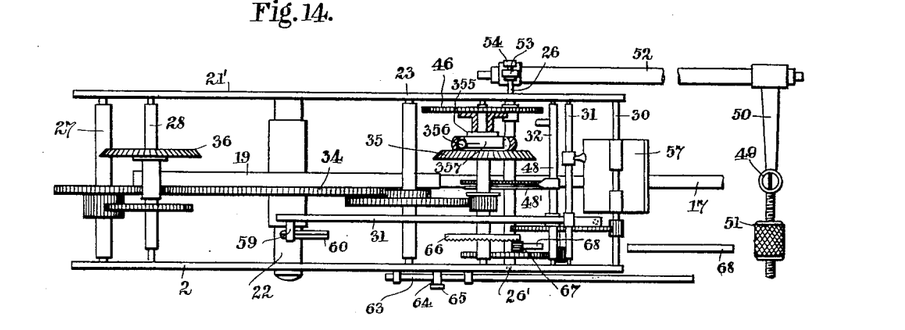
Fig. 14 is a part-sectional plan view of Fig. 12.

The wheel 19 is fixed upon the horizontal shaft 22, and is provided upon one face with a ring gear 34, and upon the other face with a cam 55, the said gear serving to actuate the right- and left-hand transmission shafts 23 and 27 through the agency of interposed gearing, while said cam is employed in connection with the subsequently-explained zero-setting of the hands of a pair of weight-indicating dials. These hands are fixed to a pair of sleeves 37 and 38 which are loosely mounted upon shafts 39 and 40 and are rotated by bevel gears 35' and 36' that mesh with and are driven by bevel gears 35 and 36, mounted upon the shafts 24 and 28, respectively, said shafts being driven, in turn, from shafts 23 and 27 by means of intermediate gearing, as shown in Figs. 12 to 14. The afore-mentioned sleeves 37 and 38 are enlarged at their lower ends to form barrels inclosing controlling springs therefor, (not shown), and these barrels are equipped with stops 41 which are normally engaged, under the action of said springs, with pins 42 provided upon gears 35' and 36', so that the latter and the barrels are thus connected. Such connection is interrupted, however, when the return or reverse rotation of wheel 19 commences, by reason of the fact that cam 55 has at that time reached a position where it presses against a finger 43 provided upon a centrally-fulcrumed, spring-controlled lever 44, with the result that said lever is caused to rock sidewise about its fulcrum point, thereby engaging its hooked terminals 45 with said stops 41 and preventing further movement of said barrels.

The gear 35, as shown in Figs. 15 and 16, is formed with an annular boss 355, containing a ball 356, which, during the normal rotation of said gear, (that is to say, the rotation produced in consequence of the travel of the poise toward the end of the beam), is designed to engage the inclined clutch face of an arm 357 that is connected to a gear 46, loose on the rear end of shaft 24, so that such rotation of gear 35 will effect corresponding rotation of the last-named gear, but the latter will not be rotated during the reverse rotation of gear 35 incidental to re-winding, since the clutch action is no longer exerted upon arm 357, as will be understood, said arm and the gear 46 remaining stationary at that time. The aforesaid gear 46 is utilized to rotate, through the agency of an intermediate gear, the rear section 26 of a two-part shaft, and this shaft section carries upon its inner end a clutch disk 48 which, during the inward movement of said section, is brought into engagement with a similar disk 48' mounted upon the front shaft section 26'. During the first portion of the movement of the poise, the speed of which is controlled by the regulator 25 and its drum 47, the two disks 48' and 48 are separated, and the front shaft section is stationary, but when the said poise approaches its point of equilibrium, it produces a slight depression of the extremity of the beam, which, in turn, accomplishes the movement of the shaft section 26 necessary to effect the clutching of said disks. To this end, there rests upon the said extremity of the beam a depending finger 49, which is mounted upon an arm 50 secured to one end of a horizontal rock shaft 52 journaled in the framework behind the back plate 21', said arm carrying an adjustable weight 51 that serves to hold said finger against the beam. At the other end of shaft 52 is fixed a vertical arm 53, provided with a terminal projection 54 which is disposed in line with the projecting end of the shaft section 26, the arrangement being such, therefore, that when the first-named, or horizontal arm 50 swings downward consequent upon the depression of the beam, the vertical arm 53 will swing inward, thereby causing its projection 54 to force the said shaft section 26 inwardly, with the result that the two clutch disks engage and both shaft sections rotate in unison. The rotation of the front section 26' is thereupon transmitted through gearing to a shaft 56, equipped with a spring-controlled driving gear, which, in turn, effects the rotation of shaft 30 and the regulator 57 thereon, the latter operating independently of the regulator 25 and causing the poise to slacken its movement until its advance to position of equilibrium is barely perceptible. As the said poise reaches this position, the extremity of the beam is again depressed, carrying with it in its movement an upstanding detent 58 provided at its top with a shoe 60, on which a lateral finger 59 is adapted to rest, the said detent being affixed to the beam adjacent the pivot 3. The finger 59 is located upon the long arm of the detent lever 31, and when the detent moves downward, said arm will drop, thereby raising the short arm and, in consequence, releasing the latter from the stop pawl 32, the point of the said pawl being immediately forced to engage the disks 48' by the action of its controlling spring, whereupon the clockwork, the hands and the cams of the subsequently-described recorder will be stopped.

To return the various parts to their respective initial positions, there is provided a clutch which consists of a pair of toothed sleeves 33 and 33', the former of which is fixed upon shaft 22, while the latter is movable toward and from the same and is rigidly connected to the slidable winding handle 61, the two sleeves being normally separated by an interposed spring, (not shown). The wheel 19 and its associated parts may thus be rotated by the said handle, when the two clutch sleeves are engaged, in the opposite direction to that of normal running, in order to retract the poise and wind up the driving spring of the regulator 25. Toward the end of the rewinding operation, a stop 62, provided upon the fixed clutch sleeve 33, is caused to strike against the head of a buffer rod, with the result that the latter is forced backward, and its controlling spring compressed. This movement of the buffer rod brings a notch 64 therein into line with the stem of a depending push-button 65 formed on a sleeve which is loosely mounted upon a horizontal shaft 68, so that when pressure is applied to said button, it will be free to move inward, owing to its stem entering said notch. The shaft 68 is disposed in front of plate 21, and the sleeve thereon, to which the push-button is connected, is also provided with an arm 655 that projects beneath the long arm of the detent lever 31, so that the inward movement of the said push-button will thus produce an upward movement of the aforesaid lever arm, and, consequently, a downward movement of the short arm of the lever, the latter arm bearing upon the stop pawl 32 and thus releasing the point thereof from disk 48′, with the result that the operation of the clockwork immediately commences.

Figures 1, 1A:
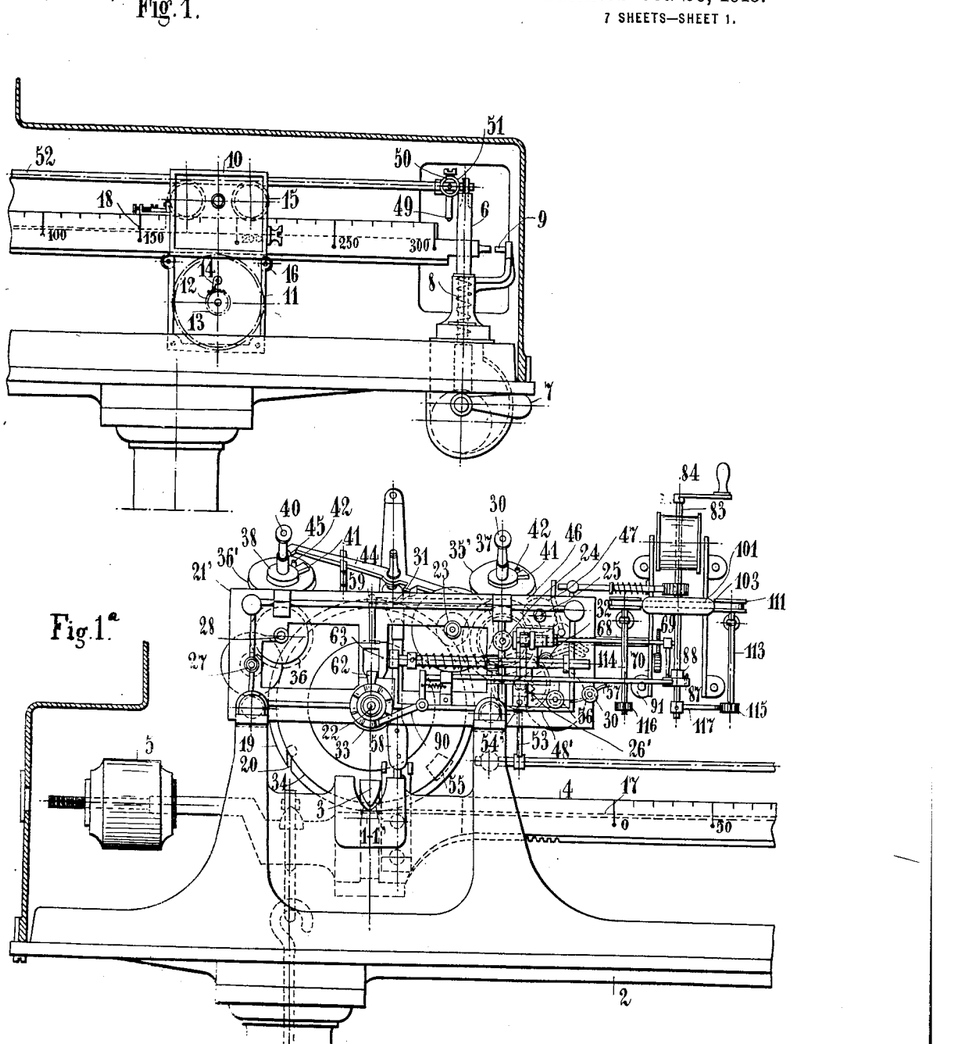
Figures 2, 11:
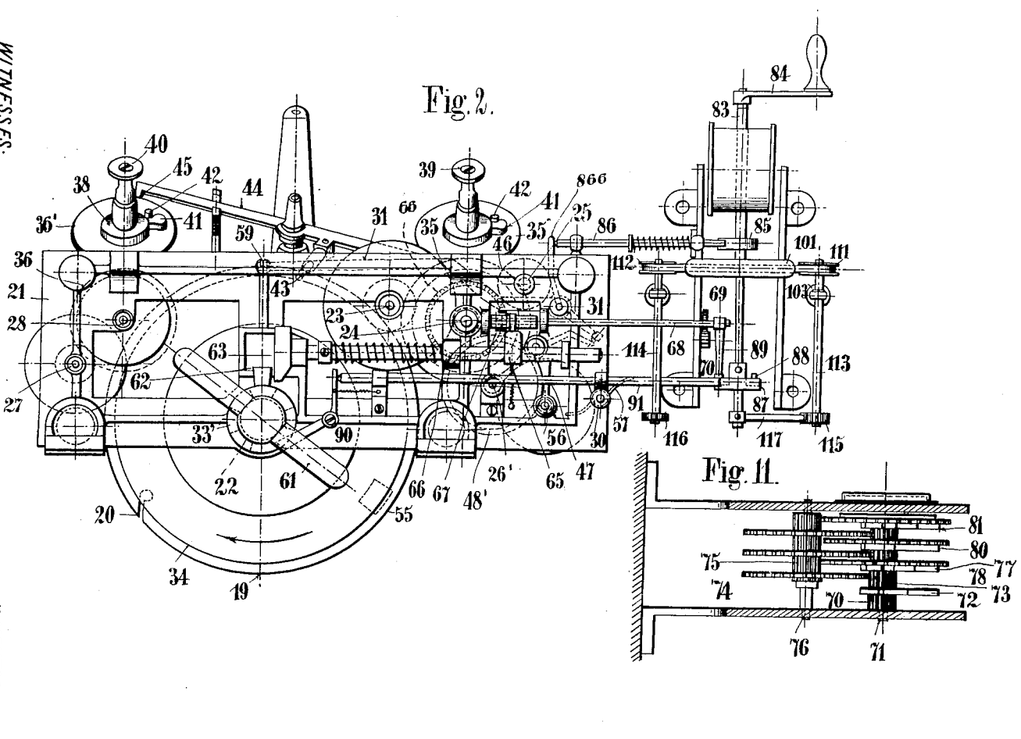
Fig. 2 is a slightly enlarged fragmental front elevation, with the beam omitted.
Fig. 11 is a horizontal section of the recorder.

The device for recording the successive weights indicated upon the beam and the dials preferably comprises two separate mechanisms:—one, a series of cams, and setting gears therefor, operable automatically from the clockwork; and the other, the printing or recording mechanism proper which is operable manually prior to the rewinding operation. The construction and arrangement of the first mechanism and its component parts are preferably as follows:—The shaft 24, (Fig. 14), has affixed to it a crown gear 66, which meshes with and drives a gear 67 on the above-mentioned shaft 68, the latter carrying at its outer end a gear 69 that meshes with a gear 70, loose on a stationary shaft 71, best shown in Figs. 9 and 11. The gear 70 has fixed to it a ten-stepped cam 72, the ratios of the gears controlling this cam being as 10 to 1, so that the cam makes exactly one complete revolution for 1 kilogram, each step corresponding to a hectogram. The gear 73, which is fixed to the other side of cam 72, meshes with the adjacent member 74 of a compound gear loose on a second stationary shaft 76, the other member 75 thereof meshing with a gear 77 that is loose on a shaft 71 and has fixed to it a second cam 78. Two other cams 80 and 81 are also loosely mounted on shaft 71 and are operated in the same manner as the cam 78, each of these cams making exactly one tenth of the number of revolutions made by the one immediately preceding it. Thus, the cam 78 makes one revolution for 10 kilograms, and each of its steps corresponds to 1 kilogram; the cam 80 makes one revolution for 100 kilograms, and each step corresponds to 10 kilograms; and the cam 81 makes one revolution for 1000 kilograms, and each step corresponds to 100 kilograms. The several gears and cams just described are, therefore, actuated in unison with the clockwork during both winding and unwinding, the positions of the cams bearing a definite relation at all times to the positions of the hands upon the dials and the poise upon the beam.

The printing or recording mechanism, proper, as shown in Fig. 10, consists, primarily, of a vertical shaft 83, equipped at its top with a handle 84 by which it is rotated, to effect the various registering and recording operations, said shaft being prevented from turning through more than a single revolution by means of a pair of cams 85 and 87. The upper cam 85, (Fig. 2), is normally engaged by the adjacent end of a spring-controlled rod 86, the other end of which is itself engaged by an upstanding arm 866, connected with the body portion of the detent lever 31, such engagement tending to retain shaft 83 against rotation until the depression of the beam just prior to the poise reaching its position of equilibrium takes place, when the downward movement of the long arm of the said lever causes its arm 866 to move to the left, (Fig. 2), whereupon rod 86 will be moved in the same direction by its spring, thus releasing said cam. When the detent lever requires its normal position, arm 866 will force rod 86 to the right, and the reëngagement of the outer end of said rod with cam 85 will be effected as soon as the latter completes its revolution. Somewhat the same operation takes place with respect to the lower cam 87, this cam being provided with a pin 88 which is normally engaged by the extremity of a depending arm 89 secured to shaft 68, but is released consequent upon the rotation of said shaft and the attendant upward movement of said arm. Cam 87 also coacts with the adjacent terminal of an endwise-movable rod 91, whose other end is disposed in proximity to the upper arm of a spring-controlled, angular latch 90, the other arm of which projects between the clutch sleeves 33 and 33′. Accordingly, when rod 91 is shifted to the left by the cam, the working arm of the latch will be withdrawn from between said sleeves, and the latter will be permitted to come together when handle 61 is moved inward, this movement of the rod taking place just before the reëngagement of pin 88 and arm 89.

Upon the shaft 92, there is fixed a tappet 93, (Fig. 10), which is held against the upper face of a cam 96 by means of a spring 98, the said cam being secured to shaft 83 between the cams 85 and 87. To the hub of said tappet are connected four levers 94, which, in turn, are attached to four vertical racks 95, the latter being slidable in suitable guides and being arranged to bear at their lower ends upon the steps of the four cams 72, 78, 80 and 81. The said upper face of cam 96 is formed with a notch 96', which, when brought beneath the tappet, permits the latter to enter thereinto and, in so doing, depress the levers 94 and racks 95, the movement of the racks producing the rotation of the type wheels 99 by reason of their engagement with the pinions 99' affixed to said wheels and terminating when the rack ends engage the stepped cams. The type wheels 99 coact with a platen 101, which is actuated as hereinafter described, and in consequence of the operation of said wheels by the racks, and of the engagement of the latter with the aforesaid stepped cams, the figures on the type wheels which are thus brought opposite the platen will correspond to the steps with which the rack ends are in contact. The size of the notch 96' in cam 96 is such as to enable the tappet 93 to remain therein until after the actuation of the platen has taken place, this actuation being brought about by the coaction of cam 96 with a stirrup 100. Said stirrup is engaged by said cam during its continued rotation and forced to the left, (Fig. 10), thereby moving the platen with it in the same direction into contact with the type wheels, the stirrup and platen being connected together by two rods 101' (Figs. 9 and 10) whose ends fit in openings in said parts.

Between the platen and the type wheels pass the paper strip 102 and the inking ribbon 103, and the former also passes between two feed rollers 104 and 105, the roller 105 carrying a pinion 106 in mesh with a rack formed by the offset end of a rocking lever 107 pivoted to a stationary shaft 108. The hub of this lever is provided with a tappet 107' which is adapted for engagement by a cam 109, fixed to shaft 83, the arrangement being such that when tappet 107' is so engaged, lever 107 will be lifted, and its rack thus caused to effect the rotation of the feed rollers, the said lever thereafter returning to its initial position through the agency of a spring 110. The inking ribbon 103 is wound upon two spools 111 and 112, (Fig. 2), fixed, respectively, to shafts 113 and 114, the said shafts having squared lower terminals upon which two gears 115 and 116 are slidably mounted, such arrangement enabling either gear to be moved into the path of a gear sector 117, affixed to shaft 83, so that at each revolution of the latter the inking ribbon will be wound upon the spool thus moved.

The frame constituted by the parts 100, 101 and 101' automatically assumes its initial position, with the platen part 101 out of contact with the type wheels, just before the tappet 93 moves out of notch 96', owing to the provision of a spring, (not shown), this movement of the tappet raising the levers 94 and, consequently, the racks 95.

The automatic operation of the apparatus in indicating and recording weights is substantially as follows: The parts having first of all been returned to neutral position, the load is placed upon the platform, and the handle of the cam 7 is turned to release the long arm of the beam, which thereupon rises, carrying with it the finger 49 which it supports upon its extremity. At that time, the detent 58 is inclined slightly toward the left of the operator, the notch 64 in the buffer rod 63 is located directly behind the stem of the push-button 65, the latch 90 is depressed, the rod 91 is engaged with cam 87, and the racks are raised. Pressure upon the push-button 65 will then cause its arm 65s to raise the long arm of the detent lever 31, whereupon the following actions take place: the finger 59 is disengaged from shoe 60 and immediately afterward resumes its position thereon; the stop pawl 32 rises, and releases the entire clockwork; the rod is forced to the right, (Fig. 2), by the arm 86b of the said detent lever 31 and locks the cam 85 of the recoiling mechanism; and the arm 89 releases pin 88 on cam 87, which, in turn, releases rod 91 and latch 90, the latter assuming a position between the two clutch sleeves 33 and 33' of the winding device. Under the influence of the movement of the sliding poise 10, due to the expansion of its driving spring, the wheel 19, the wheel shaft 22, and the gears controlled by said shaft, are rotated with the speed regulator 25, the said poise traveling with considerable rapidity toward the end of the beam. At the moment at which it approaches its point of equilibrium, the beam is slightly depressed, carrying with it the finger 49 which, through the agency of the parts 51, 50, 52, 53 and 54, effects the coupling of the shaft sections 26 and 26' and of the clutch disks 48 and 48', whereupon the second regulator 57 is released and commences to operate, its action replacing and continuing that of the regulator 25. The poise continues its travel slowly, and reaches the exact point of equilibrium gradually and without shock, producing at this moment a further depression of the beam which causes the detent 58 to describe a small arc and, in so doing, to release finger 59 from shoe 60. The long arm of the detent lever 31 thereupon drops, with the result that the stopping pawl 32 falls and engages disk 48', thus producing the stoppage of all of the parts, including the poise. The beam at that time alines with the fixed pointer 9, and the hands mark upon the dials the weight corresponding to that indicated by the poise upon the graduations upon the beam, while the cams 72, 78, 80 and 81 of the recording mechanism are set in conformity with the positions of the aforesaid hands, and the rod 86 has become disengaged from cam 85 through the agency of its controlling spring, thus permitting the recording mechanism to operate. In order to record the weight thus indicated, the shaft 83 is caused to make a complete revolution, by means of its handle 84, whereupon the following operations take place in succession:—depression of the racks 95 upon the steps of the cams 72, 78, 80 and 81; impact of platen 101 against the type wheels 99; lifting of the said racks; rotation of the feed rollers 104 and 105 by cam 109 and rack 107; advance of the inking ribbon 103 by sector 117 and either of the gears 115 and 116; movement of rod 91 to the left by cam 87, which depresses latch 90 from between the two sleeves 33 and 33' of the winding clutch; and, finally, engagement of pin 88 on cam 87 by the locking arm 89. As soon as the recording operation has been completed, the re-winding is commenced, this being effected by handle 61 which is first moved inward, to couple the sleeves 33 and 33', and then turned in a clockwise direction. During re-winding, the sliding poise and the cams of the recording mechanism are returned to normal position, the hands are stopped at the zero points on the dials, and the second regulator 57 is wound up, the various other gears continuing their return or reverse movement until the stop 62 on sleeve 33 has re-set the buffer rod 63, at which time latch 90 moves between sleeves 33 and 33' and terminates the rewinding. The apparatus is then ready for a new weighing operation, but the mechanism cannot be started, however, unless the preceding weighing has been recorded and all of the parts completely returned to initial position, nor can an incorrect weighing be recorded for the reason that the recording mechanism cannot be operated unless the beam has actually assumed a position of equilibrium; that is to say, unless the detent lever has fallen at the end of the weighing operation and has released rod 86.

Where the apparatus is to be regulated for loads of given weight, the procedure is as follows:—After the various parts have been restored to normal position, and the beam has been locked by the cam 7 and rod 8, pressure is applied to the push button, and the mechanism thus started. When the poise has traveled slightly beyond the position corresponding to the given weight, cam 7 is turned to unlock the beam, the extremity of which drops and thereby stops the entire mechanism. Shaft 24 is then turned by means of a spanner wrench, so as to move back the hand controlled thereby to the exact point on the dial corresponding to the weight desired. Then, according as the load is too light or too heavy, it is only necessary for the operator to add or remove the quantity of material required to exactly balance the beam, as in the case of an ordinary balance scale. The apparatus having once been set for a definite weight, successive weighings for that weight can be repeated without re-winding, since it is merely necessary to lock the beam after each operation and then release it for the subsequent regulation of the fresh load.

I claim—

1. In a weighing apparatus, the combination of a beam; a self-propelled poise adapted to travel thereon; normally-locked mechanism holding said poise against movement, but releasable to permit it to move; means controlled by said beam for gradually reducing the speed of said mechanism after having been released, when the poise approaches the point of equilibrium; means also controlled by said beam for arresting said mechanism when the poise reaches such point; and a flexible connection between said mechanism and said poise for operating the former from the latter.

2. In a weighing apparatus, the combination of a beam; a poise adapted to travel thereon and having propelling mechanism within its interior; normally-locked mechanism holding said poise against movement, but releasable to permit it to move; means controlled by said beam for gradually reducing the speed of said mechanism after having been released, when the poise approaches the point of equilibrium; means also controlled by said beam for arresting said mechanism when the poise reaches such point; and a flexible connection between the second-named mechanism and the poise for operating the former from the latter.

3. In a weighing apparatus, the combination of a beam; a poise adapted to travel thereon and having propelling mechanism within its interior; weight-indicating mechanism; normally-locked mechanism holding said poise against movement but releasable to permit it to move; means operated by said mechanism, when released, for actuating said indicating mechanism; means controlled by said beam for gradually reducing the speed of said mechanism, after having been released, when the poise approaches the point of equilibrium; means also controlled by said beam for arresting said mechanism when the poise reaches such point; and a flexible connection between said normally-locked mechanism and said poise for operating the former, when released, from the latter.

4. In a weighing apparatus, the combination of a beam; a poise adapted to travel thereon and having interiorly-located means for effecting its propulsion; a device for regulating the speed of the initial movement of said poise; a separate device for regulating the speed of the final movement of said poise; and means controlled by said beam for bringing the second-named device into action automatically when said poise approaches the point of equilibrium, said second-named device gradually reducing the speed of movement of said poise.

5. In a weighing apparatus, the combination of a beam; a self-propelled poise adapted to travel thereon; a rotatable element; normally-locked mechanism associated with said element for holding said poise against movement, said mechanism being releasable to permit said poise to move; means controlled by said beam for gradually reducing the speed of said mechanism, after having been released, when the poise approaches the point of equilibrium; means also controlled by said beam for arresting said mechanism when the poise reaches such point; and a flexible connection between said element and said poise for rotating the former during the movement of the latter.

6. In a weighing apparatus, the combination of a beam; a self-propelled poise adapted to travel thereon; a rotatable element; normally-locked mechanism associated with said element for holding said poise against movement, said mechanism being releasable to permit said poise to move; means controlled by said beam for gradually reducing the speed of said mechanism, after having been released, when the poise approaches the point of equilibrium; means also controlled by said beam for arresting said mechanism when the poise reaches such point; a flexible connection between said element and said poise for rotating the former during the movement of the latter; and indicating mechanism connected to said element to be operated thereby during such rotation.

7. In a weighing apparatus, the combination of a beam; a self-propelled poise adapted to travel thereon; clockwork normally holding said poise against movement, but releasable to permit it to move, said clockwork embodying a device for regulating the speed of the initial movement of the poise, and a device for regulating the speed of the final movement of said poise; and means controlled by said beam for bringing the second-named device into action automatically when said poise approaches the point of equilibrium, said second-named device gradually reducing the speed of movement of said poise.

8. In a weighing apparatus, the combination of a beam; a self-propelled poise adapted to travel thereon; normally-locked mechanism holding said poise against movement, but releasable to permit it to move; means controlled by said beam for gradually reducing the speed of said mechanism, after having been released, when the poise approaches the point of equilibrium; means also controlled by said beam for arresting said mechanism when the poise reaches such point; and means for recording the weights indicated.

9. In a weighing apparatus, the combination of a beam; a self-propelled poise adapted to travel thereon; normally-locked mechanism holding said poise against movement, but releasable to permit it to move; means controlled by said beam for gradually reducing the speed of said mechanism, after having been released, when the poise approaches the point of equilibrium; means also controlled by said beam for arresting said mechanism when the poise reaches such point; weight-indicating mechanism and weight-printing mechanism operatively connected with said poise; and impression mechanism coöperative with said printing mechanism.

10. In a weighing apparatus, the combination of a beam; a self-propelled poise adapted to travel thereon; a rotatable element; normally-locked mechanism associated with said element for holding said poise against movement, but releasable to permit it to move; means controlled by said beam for gradually reducing the speed of said mechanism, after having been released when the poise approaches the point of equilibrium; means also controlled by said beam for arresting said mechanism when the poise reaches such point; weight-indicating and weight printing mechanisms operatively connected with said element; impression mechanism coöperative with said printing mechanism; and a flexible connection between said element and said poise for rotating the former during the movement of the latter.

11. In a weighing apparatus, the combination of a beam; a self-propelled poise adapted to travel thereon; a rotatable element; weight-indicating mechanism operatively associated with said element; a flexible connection between said element and said poise for rotating the latter during the movement of the former; normally-locked clockwork controlling the movement of said poise; and including means for gradually reducing the speed of such movement when the poise approaches the point of equilibrium; means for releasing said clockwork; means operated by said beam for controlling the speed-reducing means; and means under the control of said beam for automatically stopping said clockwork when the poise reaches the point of equilibrium.

12. In a weighing apparatus, the combination of a beam; a self-propelled poise adapted to travel thereon; normally-locked clockwork controlling the movement of said poise; and including means for gradually reducing the speed of such movement when the poise approaches the point of equilibrium; means for releasing said clockwork; means operated by said beam for controlling the speed-reducing means; and means under the control of said beam for automatically stopping said clockwork when the poise reaches the point of equilibrium.

13. In a weighing apparatus, the combination of a beam; a self-propelled poise adapted to travel thereon; normally-locked clockwork controlling the movement of said poise and including a pawl governing the action of the clockwork; means for releasing said pawl to permit movement of the clockwork; and means under the control of the beam for automatically reëngaging said pawl when the poise reaches the point of equilibrium, to stop the clockwork.

14. In a weighing apparatus, the combination of a beam; a self-propelled poise adapted to travel thereon; normally-locked clockwork controlling the movement of said poise and including a detent lever, and a pawl engaged therewith and with the clockwork for governing the action of the latter; means operative upon said lever to release said pawl and permit movement of the clockwork; and means operative upon said lever and under the control of the beam for automatically reëngaging said pawl with said clockwork to stop the same when the poise reaches the position of equilibrium.

In testimony whereof I have signed this specification in the presence of two subscribing witnesses.

E. OUTREBON.

Witnesses:
  O. RAMO,
  G. BAMBROUS.